United States Patent
Ichinose et al.

(10) Patent No.: US 7,951,482 B2
(45) Date of Patent: May 31, 2011

(54) NON-AQUEOUS ELECTROLYTE SECONDARY BATTERY AND BATTERY MODULE

(75) Inventors: Hiroaki Ichinose, Osaka (JP); Masatoshi Nagayama, Osaka (JP)

(73) Assignee: Panasonic Corporation, Osaka (JP)

( * ) Notice: Subject to any disclaimer, the term of this patent is extended or adjusted under 35 U.S.C. 154(b) by 1318 days.

(21) Appl. No.: 11/442,983

(22) Filed: May 31, 2006

(65) Prior Publication Data
US 2006/0269842 A1    Nov. 30, 2006

(30) Foreign Application Priority Data
May 31, 2005   (JP) .................................. 2005-158709

(51) Int. Cl.
*H01M 2/16* (2006.01)
*H01M 2/24* (2006.01)
*H01M 2/02* (2006.01)
*H01M 2/18* (2006.01)

(52) U.S. Cl. ........ 429/144; 429/158; 429/251; 429/252; 429/254

(58) Field of Classification Search .................. 429/152, 429/149, 252, 159, 206, 144, 153, 148, 254, 429/158; 419/2; 521/71
See application file for complete search history.

(56) References Cited

U.S. PATENT DOCUMENTS

| | | | | |
|---|---|---|---|---|
| 692,507 | A * | 2/1902 | Edison | 429/206 |
| 1,622,767 | A * | 3/1927 | Cole | 429/159 |
| 2,912,479 | A * | 11/1959 | Poole | 521/71 |
| 3,021,379 | A * | 2/1962 | Jackel | 429/27 |
| 3,287,112 | A * | 11/1966 | Blaha | 419/2 |
| 4,216,281 | A * | 8/1980 | O'Rell et al. | 429/252 |
| 5,322,745 | A * | 6/1994 | Yanagihara et al. | 429/59 |
| 5,948,464 | A | 9/1999 | Delnick | |
| 6,180,282 | B1 * | 1/2001 | Nishida et al. | 429/137 |
| 2002/0034626 | A1 * | 3/2002 | Liu et al. | 428/312.6 |
| 2002/0102455 | A1 * | 8/2002 | Daroux et al. | 429/144 |
| 2005/0069777 | A1 | 3/2005 | Takami et al. | |
| 2005/0221172 | A1 * | 10/2005 | Kato et al. | 429/144 |

FOREIGN PATENT DOCUMENTS

CN    1601800    3/2005
(Continued)

OTHER PUBLICATIONS

Korean Office Action, with English translation, issued in Korean Patent Application No. KR 10-2006-0048629, mailed Feb. 29, 2008.

(Continued)

*Primary Examiner* — Jonathan Crepeau
*Assistant Examiner* — Kenneth Douyette
(74) *Attorney, Agent, or Firm* — McDermott Will & Emery LLP

(57) ABSTRACT

A non-aqueous electrolyte secondary battery including an electrode assembly, a non-aqueous electrolyte, and a substantially rectangular battery case for housing the electrode assembly and the non-aqueous electrolyte. The thickness α, the width β, and the height γ of the battery case satisfy the relation $\alpha < \beta \leq \gamma c$. The electrode assembly includes a positive electrode, a negative electrode, and a porous heat-resistant layer disposed between these electrodes. The positive electrode includes a positive electrode active material layer, and the negative electrode includes a negative electrode active material layer. The ratio of the pore volume included in a predetermined area of the porous heat-resistant layer to the battery theoretical capacity is 0.18 to 1.117 ml/Ah. The predetermined area has the same area as the positive electrode active material layer. The porosity of the porous heat-resistant layer is 35 to 85%.

11 Claims, 4 Drawing Sheets

FOREIGN PATENT DOCUMENTS

| | | |
|---|---|---|
| JP | 10-106530 A | 4/1998 |
| JP | 2000-340208 | 12/2000 |
| JP | 2001-325936 | 11/2001 |
| KR | 1994-0025059 | 11/1994 |
| KR | 1997-0004113 | 1/1997 |

OTHER PUBLICATIONS

Chinese Office Action, with English translation, issued in Chinese Patent Application No. CN 200610092477.2, mailed Feb. 22, 2008.

* cited by examiner

F I G. 5
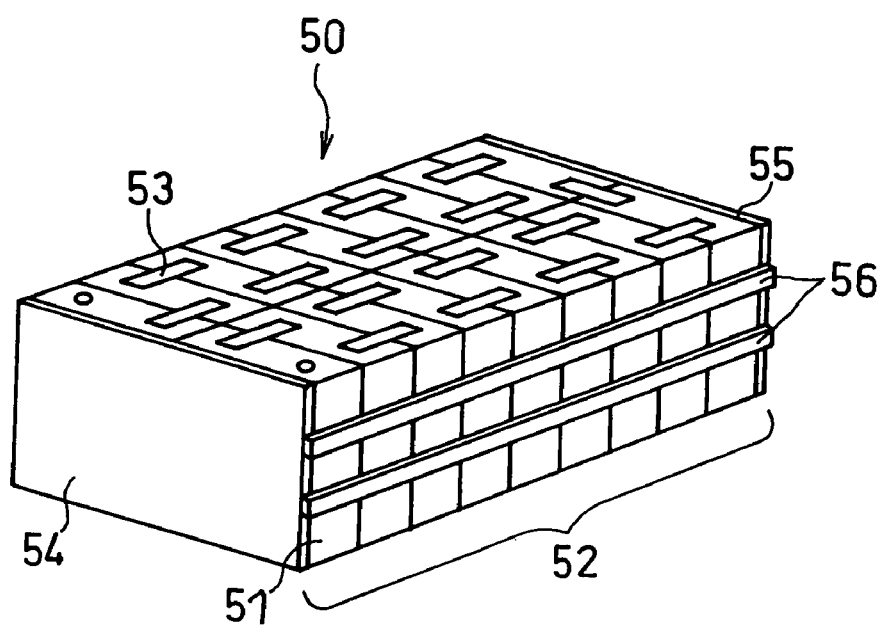

NON-AQUEOUS ELECTROLYTE SECONDARY BATTERY AND BATTERY MODULE

FIELD OF THE INVENTION

The present invention relates to non-aqueous electrolyte secondary batteries and battery modules using such batteries. More particularly, the present invention relates to a non-aqueous electrolyte secondary battery in which an electrode assembly can keep a sufficient amount of a non-aqueous electrolyte even when the change in the electrode assembly size is restrained, and to a battery module using such batteries.

BACKGROUND OF THE INVENTION

Non-aqueous electrolyte secondary batteries, particularly, lithium ion secondary batteries have a high operating voltage and a high energy density. Thus, development for lithium ion secondary battery has been spurred recently, as a power source for electrically-powered tools or vehicles which necessitate high output, in addition to a power source for driving portable electronic devices such as mobile phones, laptop computers, and camcorders. Particularly, high capacity lithium ion secondary batteries have been developed actively as a power source for replacing available nickel-metal hydride storage batteries to be used for hybrid electric vehicles (HEV).

The power source for HEVs needs to have a higher capacity, compared with the power source for small household devices. Battery modules including a plurality of substantially rectangular batteries stacked are preferably used for a power source for HEVs, since a high capacity can be obtained even with a small size module.

In such battery modules, batteries tend to be affected by a binding force for retaining the module dimension, especially the batteries positioned in the center area. Under such effects from the binding force, in non-aqueous electrolyte secondary batteries using micro-porous film comprising resin such as polyolefin as the separator, for example, when a pressure is applied to the battery, the non-aqueous electrolyte is easily forced out from the separator. In fact, when a substantially rectangular lithium ion secondary battery using a separator made of resin is molded with resin, the binding force by the molding resin forces the non-aqueous electrolyte out from the separator. As a result, ion conductivity is lost in the separator to decline the battery performance.

There has been proposed to use a highly stiff porous heat-resistant layer comprising a nonconductive filler such as silica and a binder such as polyvinylidene fluoride, instead of a conventional resin-made separator (Japanese Laid-Open Patent Publication No. Hei 10-106530).

In battery modules, several tens of substantially rectangular non-aqueous electrolyte secondary batteries are usually bound. The electrodes expand when the batteries are charged, the battery case tries to expand. However, in battery modules, each battery cannot freely change its shape since all the batteries are bound, and the force caused by the battery case deformation is likely to concentrate on the center of the module. Thus, in the battery positioned at around the center of the module, a load of 100 kgf/cm$^2$ (average 20 kgf/cm$^2$) at the maximum is applied at the ends of the battery in the thickness direction thereof while charging.

The inventors of the present invention found in their examination that under such harsh environment, the problem of the shortage of the non-aqueous electrolyte in the porous heat-resistant layer cannot be solved just by using the technique disclosed in Japanese Laid-Open Patent Publication No. Hei 10-106530.

The present invention was made in view of the above problems, and aims to provide a reliable non-aqueous electrolyte secondary battery which can avoid the forcing out of the non-aqueous electrolyte from the electrode assembly, even under the environment where the size change in the battery case is unacceptable.

BRIEF SUMMARY OF THE INVENTION

The present invention relates to a non-aqueous electrolyte secondary battery comprising an electrode assembly, a non-aqueous electrolyte, and a substantially rectangular battery case for housing the electrode assembly and the non-aqueous electrolyte. A thickness $\alpha$, a width $\beta$, and a height $\gamma$ of the battery case satisfy the relation $\alpha<\beta\leq\gamma$. The electrode assembly includes a positive electrode, a negative electrode, and a porous heat-resistant layer disposed between the positive electrode and the negative electrode. The positive electrode includes a positive electrode active material layer and the negative electrode includes a negative electrode active material layer. The ratio of a pore volume included in the predetermined area of the porous heat-resistant layer to the battery theoretical capacity is 0.18 to 1.117 ml/Ah. The porosity of the porous heat-resistant layer is 35 to 85%. The predetermined area has the same area as the positive electrode active material layer.

The non-aqueous electrolyte secondary battery preferably further includes a separator comprising resin disposed between the positive electrode and the negative electrode. The ratio of a thickness B of the porous heat-resistant layer to a thickness A of the separator, B/A, is 0.35 to 2.

The porous heat-resistant layer is preferably attached to at least one of the positive electrode active material layer and the negative electrode active material layer.

The porous heat-resistant layer preferably includes a nonconductive filler and a binder. The nonconductive filler preferably includes at least one selected from the group consisting of alumina, silica, magnesia, titania, and zirconia. The median size of the nonconductive filler is preferably 0.3 to 4 µm.

The binder preferably includes at least one of polyvinylidene fluoride and modified acrylic rubber. The amount of the binder is preferably 0.3 to 8.5 parts by weight per 100 parts by weight of the nonconductive filler.

When the porous heat-resistant layer is attached to one of the positive electrode active material layer and the negative electrode active material layer, the surface roughness of the active material layer of the electrode to which porous heat-resistant layer is not attached is preferably larger than the surface roughness of the porous heat-resistant layer.

The present invention also relates to a battery module comprising:

(a) a stack in which at least two of the above non-aqueous electrolyte secondary batteries are stacked in at least a thickness direction thereof;

(b) end plates placed at both ends of the stack, the both ends being the ends in the thickness direction of the battery; and (c) at least two bridges for binding the at least two non-aqueous electrolyte secondary batteries by connecting the two end plates.

The ratio of a thickness Y of the end plate to a thickness $\alpha$ of the case of the battery, Y/$\alpha$, is preferably 0.4 to 2.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 5 is a perspective view of a battery module of another embodiment of the present invention.

DETAILED DESCRIPTION OF THE INVENTION

Embodiment 1

Figure 1:
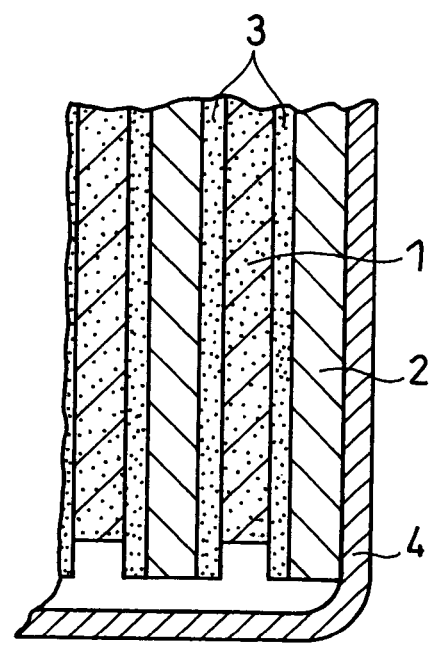
FIG. 1 is a schematic vertical cross sectional view of a portion of a non-aqueous electrolyte secondary battery according to an embodiment of the present invention.

FIG. 1 schematically shows a non-aqueous electrolyte secondary battery of an embodiment of the present invention.

Figure 2:
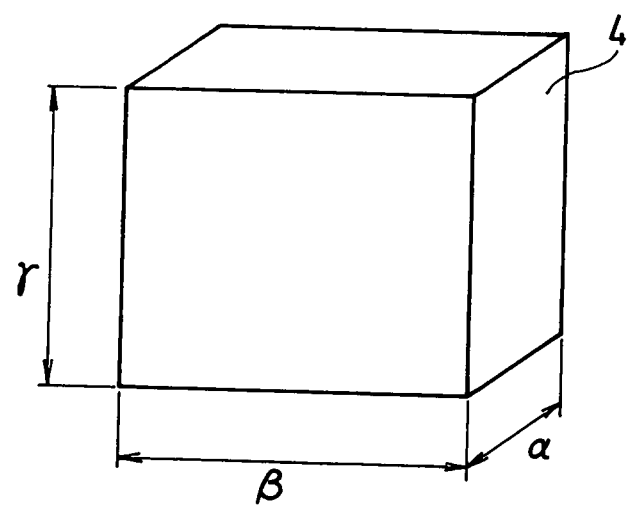
FIG. 2 is a perspective view of an example of a substantially rectangular battery case.

The battery of FIG. 1 includes an electrode assembly including a positive electrode 1 and a negative electrode 2, a non-aqueous electrolyte (not shown), and a battery case 4 for housing the assembly and the electrolyte. A porous heat-resistant layer 3 is disposed between the positive electrode 1 and the negative electrode 2. As shown in FIG. 2, the battery case 4 has a substantially rectangular shape. A thickness $\alpha$, a width $\beta$, and a height $\gamma$ of the battery case 4 (or the non-aqueous electrolyte secondary battery) satisfy a relation $\alpha<\beta\leq\gamma$. FIG. 2 only shows the shape of the battery case, and a positive electrode terminal, a negative electrode terminal, and the like are not shown.

The positive electrode 1 has a positive electrode active material layer including an active material, a binder, and a conductive agent. For the positive electrode active material, for example, $LiMO_2$ (M is at least one selected from the group consisting of Co, Ni, Mn, Al, and Mg) or $LiMn_2O_4$ may be used.

Although the positive electrode binder is not particularly limited, examples include polyvinylidene fluoride, polytetrafluoroethylene, and particulate modified acrylic rubber (polyacrylic acids) (BM-500 (product name) manufactured by Zeon Corporation). Polytetrafluoroethylene and particulate modified acrylic rubber are preferably used in combination with a thickener such as for example, carboxymethyl cellulose, polyethylene oxide, and modified acrylic rubber (polyacrylonitriles) (BM-720H (product name) manufactured by Zeon Corporation) soluble in the solvent used when the positive electrode active material layer is made.

The amount of the positive electrode binder included in the positive electrode active material layer is preferably 1 to 8 parts by weight per 100 parts by weight of the positive electrode active material. When the thickener is to be included, the amount of the thickener is preferably 1 to 4 parts by weight per 100 parts by weight of the positive electrode active material.

For the positive electrode conductive agent, for example, acetylene black, Ketjen Black, and various graphites may be used. These can be used singly or in combination.

The amount of the positive electrode conductive agent included in the positive electrode active material layer is preferably 1.5 to 8 parts by weight per 100 parts by weight of the positive electrode active material.

The positive electrode 1 may be formed of a positive electrode current collector and the positive electrode active material layer carried thereon. The positive electrode current collector is preferably a metal foil such as aluminum.

The negative electrode 2 comprises a negative electrode active material layer including an active material and a binder. For the negative electrode active material, various natural graphites, various artificial graphites, silicon-containing composite, various alloy materials may be used.

For the negative electrode binder, for example, rubber polymer including a styrene unit and a butadiene unit may be used. For example, styrene-butadiene copolymer, acrylic acid-modified styrene-butadiene copolymer or the like may be used, although not limited thereto.

The negative electrode binder is preferably used in combination with a thickener comprising water-soluble polymer. For the water-soluble polymer, a cellulose resin is preferable, especially carboxymethyl cellulose.

The amount of the negative electrode binder included in the negative electrode active material layer is preferably 0.1 to 5 parts by weight per 100 parts by weight of the negative electrode active material. When the thickener is to be included, the amount of the thickener is preferably 0.1 to 5 parts by weight per 100 parts by weight of the negative electrode active material.

The negative electrode 2 may also be formed of a negative electrode current collector and the negative electrode active material layer carried thereon. The negative electrode current collector is preferably a metal foil such copper.

The electrode assembly may be a stack-type or a wound-type. The stack-type electrode assembly may be formed for example by stacking a rectangular positive electrode 1 and a rectangular negative electrode 2 with a porous heat-resistant layer interposed therebetween. The wound-type electrode assembly may be formed by winding a sheet positive electrode 1 and a sheet negative electrode 2 with a porous heat-resistant layer disposed therebetween, so that the cross section forms a substantially rectangular shape.

The non-aqueous electrolyte includes a non-aqueous solvent, and a solute dissolved therein. For the non-aqueous solvent, without particular limitation, ethylene carbonate, ethyl methyl carbonate, propylene carbonate, dimethyl carbonate, diethyl carbonate, or the like may be used. These may be used singly or may be used in combination.

For the solute, lithium salt such as $LiPF_6$, $LiBF_4$ or the like is preferably used.

The non-aqueous electrolyte may include vinylene carbonate, cyclohexylbenzene, or derivatives thereof. By including such solvents in the non-aqueous electrolyte, a coating derived from the solvent is formed on the active material surface of the positive electrode and/or the negative electrode. Such coating enables for example assurance of battery stability under over-charged state.

In the present invention, the porous heat-resistant layer 3 has a porosity of 35 to 85%. To improve ion conductivity of the porous heat-resistant layer 3, the porosity has to be set higher. However, with an excessively higher porosity, the strength of the porous heat-resistant layer 3 decreases. By setting the porosity of the porous heat-resistant layer 3 to the above range, ion conductivity of the porous heat-resistant layer 3 is improved, while maintaining a higher strength level of the porous heat-resistant layer. The porosity of the porous heat-resistant layer 3 can be adjusted for example by changing the median size of the nonconductive filler and drying conditions. For example, the drying temperature may be set high, or the quantity of warm air supply may be increased to increase the porosity of the porous heat-resistant layer.

The ratio of a pore volume V included in a predetermined area of the porous heat-resistant layer to theoretical capacity C of the battery, V/C, is 0.18 to 1.117 ml/Ah. The predetermined area of the porous heat-resistant layer has the same area as the area of the positive electrode active material layer. For example, the pore volume V is the volume of the pores included in a portion of the porous heat-resistant layer where the face thereof contacting the positive electrode active material layer has the same area as the positive electrode active material layer. The area of the positive electrode active material layer refers to the area of a side of the positive electrode active material layer opposite to the side contacting the positive electrode current collector.

When a plurality of porous heat-resistant layers are included in the battery, the total of the pore volume included in the predetermined area of each porous heat-resistant layer is the pore volume V.

For example, when the porous heat-resistant layer is provided on both sides of one electrode, the total of the pore volume included in the predetermined area of the porous heat-resistant layers provided on both sides of the electrode is the pore volume V. The pore volume of each porous heat-resistant layer is V/2. The ratio of the V/2 to C, (V/2)/C, is preferably 0.0889 to 0.57 ml/Ah.

By setting the ratio of the pore volume V to the theoretical capacity C of the battery to 0.18 to 1.117 ml/Ah, the distribution of the non-aqueous electrolyte in the porous heat-resistant layer is optimized, and battery performance can be kept to a higher level. On the other hand, when the pore volume of the porous heat-resistant layer 3 is more than 1.117 ml/Ah, pores without the non-aqueous electrolyte charged occupy more space in the porous heat-resistant layer, to decline battery performance. When the pore volume of the porous heat-resistant layer 3 is less than 0.18 ml/Ah, the amount of the non-aqueous electrolyte sufficient for the battery to function cannot be maintained when a load is applied to the ends of the battery in the thickness direction thereof, while the battery is in charged state.

The thickness of the porous heat-resistant layer is preferably 2 to 20 μm. When the thickness of the porous heat-resistant layer is below 2 μm, the ratio V/C does not fall within the above preferable range, as long as the positive electrode is made thin. Thus, the theoretical capacity per unit volume of the battery becomes excessively small. When the thickness of the porous heat-resistant layer is over 20 μm, the ratio V/C does not fall within the preferable range, as long as the positive electrode is made thicker. Thus, a high output cannot be obtained.

As described above, by adjusting the ratio V/C to fall within the above range, the porous heat-resistant layer can keep its shape during the battery usage, even though a load of 17 to 100 kgf/cm$^2$ is applied to the ends of the battery in the thickness direction thereof (area β×γ). Further, the porous heat-resistant layer can keep the amount of the non-aqueous electrolyte sufficient for the battery to function, even a force generated by restraining the electrode assembly deformation (for example, a size restraints at the time of making a battery into a battery module) is applied on the battery.

Thus, the porous heat-resistant layer used in the present invention has many pores capable of absorbing the non-aqueous electrolyte, and has a higher rigidity. Thus, the porous heat-resistant layer is capable of keeping the sufficient amount of the non-aqueous electrolyte, in addition to having durability against the force for restraining the electrode assembly deformation while charging. Thus, even when a load is applied to the battery including the above porous heat-resistant layer, the non-aqueous electrolyte can be prevented from being squeezed out from the porous heat-resistant layer. Therefore, even with the restrictions on changing the size of the non-aqueous electrolyte secondary battery, cycle life characteristic can be made excellent. Such effect becomes notable especially in the case of substantially rectangular non-aqueous electrolyte secondary batteries that are arranged in large number in a small space.

Therefore, the non-aqueous electrolyte secondary battery of the present invention can maintain excellent cycle life characteristic and high reliability even when used as a power source for HEVs which require a high dimensional precision.

The porosity of the porous heat-resistant layer can be obtained, for example, from the thickness of the porous heat-resistant layer, the true specific gravity of the nonconductive filler and the binder, and the weight ratio between the nonconductive filler and binder. The thickness of the porous heat-resistant layer can be obtained for example by cutting the porous heat-resistant layer and determining the thickness at 10 points at the cut surface with an electron microscope. The average of the determined values is regarded as the thickness of the porous heat-resistant layer.

The pore volume V of the porous heat-resistant layer can be obtained by multiplying the volume of the porous heat-resistant layer having the same area as the positive electrode active material layer by the porosity.

The porous heat-resistant layer is preferably attached on at least one of the positive electrode and the negative electrode, for example, on the active material layer of the electrode. By attaching the porous heat-resistant layer on the electrode, the structural strength of the porous heat-resistant layer can be kept to a higher level. The battery capacity of usual secondary batteries are regulated by a positive electrode. That is, the size of the negative electrode active material layer is made larger than that of the positive electrode active material layer. In such a case, the porous heat-resistant layer is preferably attached at least on the negative electrode active material layer, in view of preventing a short circuit between the positive electrode and the negative electrode.

The porous heat-resistant layer may be formed of a nonconductive filler as a main material and a binder for binding the nonconductive filler particles. The porous heat-resistant layer may be a porous sheet comprising a highly heat-resistant resin. For the highly heat-resistant resin, for example, aramid and polyamideimide with a melting temperature of 250° C. or more may be mentioned.

For the material forming the nonconductive filler, for example, heat-resistant resin and organic oxide may be mentioned. When the nonconductive filler comprises organic oxide, the nonconductive filler preferably includes at least one selected from the group consisting of alumina, silica, magnesia, titania, and zirconia. This is because these organic oxides are high in heat-conductivity and electrochemical stability. When the nonconductive filler comprises the heat-resistant resin, for the nonconductive filler, for example, beads comprising the heat-resistant resin may be used.

For the nonconductive filler, the nonconductive filler of various forms may be used. However, the median size of the nonconductive filler is preferably 0.3 to 4 μm. When the porous heat-resistant layer is formed from a nonconductive filler and a binder, the gaps formed between nonconductive filler particles function as pores that become moving paths for ions. When the nonconductive filler has an excessively small median size, the nonconductive filler is so densely charged that the pore volume in the porous heat-resistant layer becomes small. On the other hand, when the median size of the nonconductive filler is excessively large, the nonconductive filler is so roughly scharged that the strength of the porous heat-resistant layer cannot be made higher. Thus, by setting the median size of the nonconductive filler to 0.3 to 4 µm, a porous heat-resistant layer with an appropriate pore volume and a higher strength can be formed.

The binder included in the porous heat-resistant layer preferably includes at least one of polyvinylidene fluoride and acrylic rubber. Binders generally absorb non-aqueous electrolytes and swell after batteries are formed. Thus, the amount of the binder to be added is preferably small. Since the polyvinylidene fluoride and the acrylic rubber mentioned above exhibit binding effects even with a small amount, the amount to be added can be made small.

For the acrylic rubber, for example, particulate modified acrylic rubber (BM-500B (product name) manufactured by Zeon Corporation) and modified acrylic rubber (BM-720H (product name) manufactured by Zeon Corporation) that is soluble in the solvent used for the paste for manufacturing the porous heat-resistant layer may be mentioned.

When polyvinylidene fluoride is used for the binder, an appropriate viscosity can be given to the paste for making the porous heat-resistant layer. Thus, a homogenous porous heat-resistant layer can be formed. The above-mentioned particulate modified acrylic rubber is preferably used in combination with a thickening binder, particularly, polyvinylidene fluoride, carboxymethyl cellulose, polyethylene oxide, and a modified acrylic rubber soluble in the above-mentioned solvent.

The amount of the binder included in the porous heat-resistant layer is preferably 0.3 to 8.5 parts by weight per 100 parts by weight of the nonconductive filler. As mentioned in the above, binders swell by absorbing non-aqueous electrolytes after batteries are formed, and as a result, pore diameters in the porous heat-resistant layer become small. Thus, ion conductivity of the porous heat-resistant layer may decrease. Thus, although the smaller the amount of the binder to be added, the better, when the amount of the binder to be added is excessively small, the strength of the porous heat-resistant layer is reduced. By setting the amount of the binder within the above range, the porous heat-resistant layer with appropriate ion conductivity and high strength can be obtained.

A manufacturing method of a porous heat-resistant layer including a nonconductive filler and a binder is explained next.

A nonconductive filler and a binder are mixed with a predetermined dispersion medium or solvent. The obtained mixture is stirred by for example a double-armed kneader to obtain a paste. This paste is applied on an electrode or on a metal plate from which a formed porous heat-resistant layer easily separates, by a doctor blade or a die coater, and the applied paste is dried with a far-infrared radiation or a hot blast. The porous heat-resistant layer is thus formed.

When the porous heat-resistant layer is attached on the active material layer of one of the positive electrode and the negative electrode, the surface roughness of the active material layer of the other electrode on which the porous heat-resistant layer is not attached is preferably larger than the surface roughness of the porous heat-resistant layer. The ratio of a surface roughness Ra1 of the porous heat-resistant layer and a surface roughness Ra2 of active material layer of the other electrode on which the porous heat-resistant layer is not attached is preferably 1:2 to 1:8. The porous heat-resistant layer is highly stiff but fragile. Therefore, when the battery is dropped, the porous heat-resistant layer may be damaged or the relative position of the positive electrode and the negative electrode may be misaligned. On the other hand, by making the surface roughness of the active material layer large, the anchor effect causes the porous heat-resistant layer to be caught into the active material layer to which the porous heat-resistant layer is not attached. Thus, battery durability can be improved against problems such as dropping.

Figure 3:
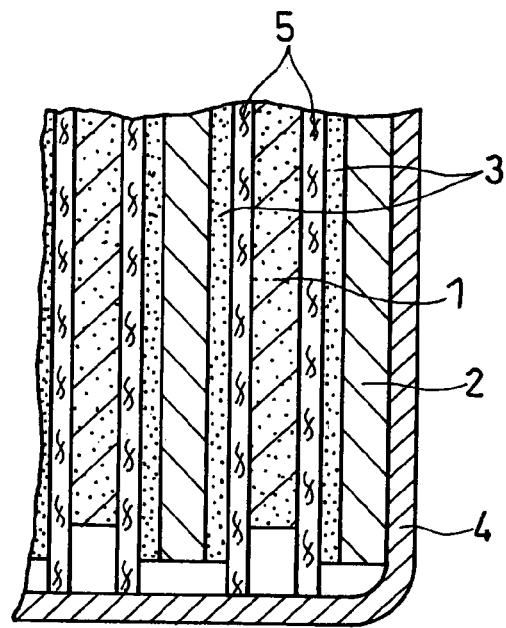
FIG. 3 is a schematic vertical cross sectional view showing a portion of a non-aqueous electrolyte secondary battery according to another embodiment of the present invention.

As shown in FIG. 3, a separator 5 comprising resin can be disposed between the positive electrode 1 and the negative electrode 2, other than the porous heat-resistant layer 3. In FIG. 3, the porous heat-resistant layer 3 is formed on the negative electrode 2. In FIG. 3, the same reference numerals are given to the same components as in FIG. 1.

By further disposing the separator comprising resin between the positive electrode and the negative electrode, the highly stiff but fragile porous heat-resistant layer can be protected by the separator. Thus, durability of the battery can be improved against problems such as peeling off of the porous heat-resistant layer from the electrode. Further, even when the porous heat-resistant layer is peeled off, with the separator comprising resin disposed between the positive electrode and the negative electrode, a short circuit between the positive electrode and the negative electrode can be prevented.

The separator 5 is preferably a micro-porous film comprising a resin with a melting point of 200° C. or less. Particularly, the material forming the separator is further preferably polyethylene, polypropylene, a mixture of polyethylene and polypropylene, or a copolymer including an ethylene unit and a propylene unit. The separator 5 may include a filler and the like. The resin component is preferably 50 to 100 wt % of the separator.

By forming the separator 5 from the above materials, in the case of the battery external short circuit, the heat caused by the external short circuit melts the separator 5 to eliminate the pores exist in the separator. This increases the battery resistance, and decreases the short circuit current. Thus, even in the case of the battery external short circuit, the battery can be prevented from having a high temperature from the heat caused.

When the battery further includes a separator, the ratio of a porous heat-resistant layer thickness B to a separator thickness A, B/A, is preferably 0.35 to 2. The porous heat-resistant layer thickness B refers to the thickness of one porous heat-resistant layer.

When the dimensional change in the battery case is restricted, the separator cannot exhibit its ability to keep the non-aqueous electrolyte sufficiently. Thus, when the separator is excessively thick relative to the porous heat-resistant layer, the separator becomes a mere resistant component for battery reaction. On the other hand, when the ratio B/A is greater than 2, the effects noted in the above cannot be exhibited easily. Thus, by setting the ratio B/A within the above range, peeling off or the like of the porous heat-resistant layer can be prevented, while decreasing resistance in battery reaction.

The thickness of the separator 5 is preferably 10 to 40 µm in view of securing ion conductivity while keeping the energy density.

The material forming the battery case may be a metal material or a laminate film. The metal material includes for example iron and aluminum. When the battery case is formed of a metal plate comprising the above metal material, the thickness of the metal plate is preferably 100 to 500 µm. When the battery case is made of iron, the inner portion of the battery case is preferably nickel-plated. The laminate film includes a film comprising a three layers made up of for example a polyamide layer, an aluminum layer, and a polyethylene layer. The thickness of the laminate film is preferably 50 to 200 μm.

Embodiment 2

With reference to FIGS. 4 to 7, a battery module formed from a plurality of non-aqueous electrolyte secondary batteries of the present invention is explained.

A battery module of the present invention comprises:

(a) a stack in which at least two of the above non-aqueous electrolyte secondary batteries are stacked in at least the thickness direction of the battery;

(b) end plates placed on both ends of the stack, the ends being the ends in the thickness direction of the battery; and (c) at least two bridges for binding the at least two batteries by connecting the two end plates.

Figure 4:
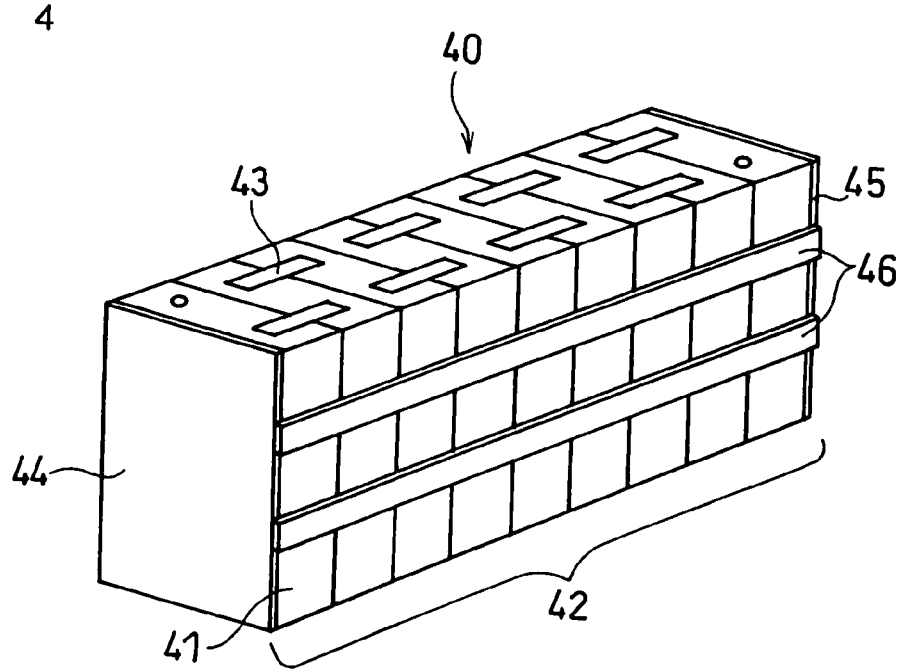
FIG. 4 is a perspective view of a battery module of an embodiment of the present invention.

As an example, FIG. 4 shows a battery module in which the above non-aqueous electrolyte secondary batteries are stacked in the thickness direction of the battery.

The battery module 40 in FIG. 4 comprises a stack 42 in which a plurality of the above non-aqueous electrolyte secondary batteries 41 are stacked in the thickness direction of the battery.

On first and second ends of the stack 42, end plates 44 and 45 are placed. The first and second ends refer to the ends of the stack in the battery thickness direction. The end plates 44 and 45 are connected by four bridges 46. In FIG. 4, two bridges are contacting third end of the stack. The third end here refers to the one end in the battery width direction. The other two bridges (not shown) are contacting fourth end opposite to the third end. One bridge may be provided at each of the third and fourth ends. Alternatively, at least one bridge may be placed on each of the four planes of the stack where the end plate is not placed to connect the two end plates.

Each battery 41 is connected in series by a connective terminal 43. In FIG. 4 as well, the positive electrode terminal and the negative electrode terminal provided at the battery 41 are not shown. When the battery case is formed from an insulator such as a laminate sheet, these terminals do not have to be insulated from the battery case.

When conventional non-aqueous electrolyte secondary batteries are used to form the battery module as in the above, repeated charge and discharge cause non-aqueous electrolyte to be squeezed out from the electrode assembly of the battery placed in the center of the battery module. Thus, the battery placed in the center of the battery module deteriorates to a greater degree, and battery performance varies among the batteries in the battery module. The variation in battery performance of each battery causes cycle life characteristic of the battery module to drastically drop. On the other hand, in the non-aqueous electrolyte secondary battery of the present invention, even under pressure, the porous heat-resistant layer can sufficiently keep the non-aqueous electrolyte. Thus, the battery module using the non-aqueous electrolyte secondary battery of the present invention can avoid a sudden drop in cycle life characteristic, unlike battery modules using conventional non-aqueous electrolyte secondary batteries.

The ratio of a thickness Y of the end plate to a thickness α of the non-aqueous electrolyte secondary battery (i.e., a thickness of the battery case), $Y/\alpha$, is preferably 0.4 to 2. The thickness of the end plate is in proportion to the force to restrain the electrode assembly deformation. The thicker the end plate, the easier to keep the electrode assembly to a predetermined size. However, when the end plate is excessively thin, the electrode assembly cannot be kept to a predetermined size. When the end plate is excessively thick, the distortion from the electrode assembly deformation cannot even be eased between the stacked non-aqueous electrolyte secondary batteries. Thus, by setting the ratio of the end plate thickness Y to the battery thickness $\alpha$, $Y/\alpha$, within the above range, distortion from the electrode assembly deformation can be eased between the non-aqueous electrolyte secondary batteries, while keeping the battery module to a predetermined size.

For the material forming the end plates 44 and 45, and the bridge 46, metals such as aluminum, an aluminum alloy, steel, and stainless steel are preferably used in view of strength and durability. In the battery module, the material forming the end plate and the material forming the bridge may be the same or different.

The bridge may be connected to the end plate by using screws, or by welding.

In the stack included in the battery module, as shown in FIG. 5, the non-aqueous electrolyte secondary batteries may be stacked in the width direction thereof, in addition to the thickness direction thereof.

A battery module 50 in FIG. 5 comprises a stack 52, in which the non-aqueous electrolyte secondary batteries 51 are stacked in the width direction and the thickness direction thereof. As in the above, each battery 51 is connected by a connective terminal 53 in series.

At both ends of the stack 52 (the ends being the ends in the battery thickness direction), end plates 54 and 55 are placed. Four bridges 56 are also placed, as in the battery module in FIG. 4.

Figure 6:
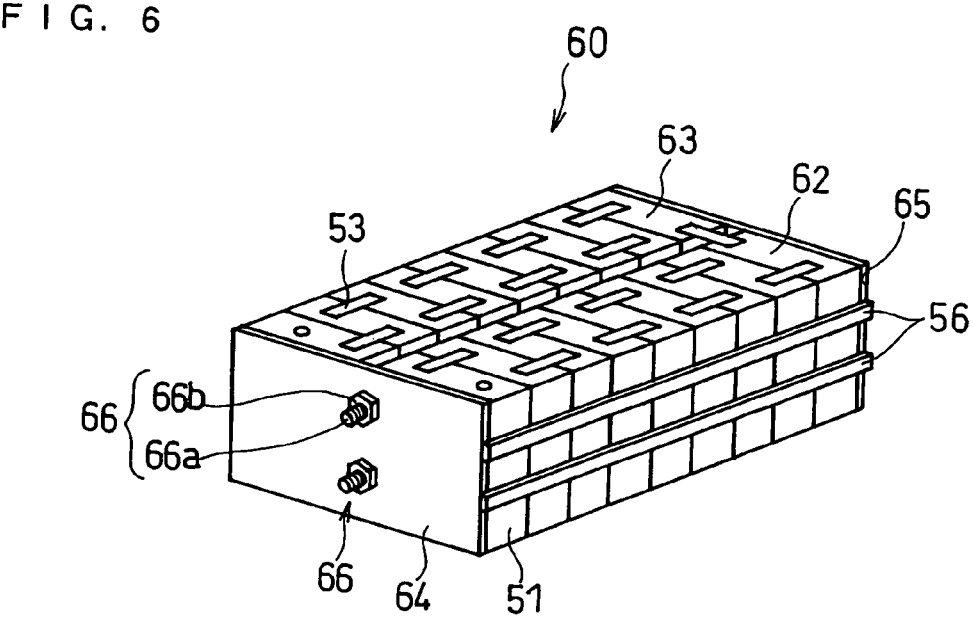
FIG. 6 is a perspective view of a battery module of still another embodiment of the present invention.
Figure 7:
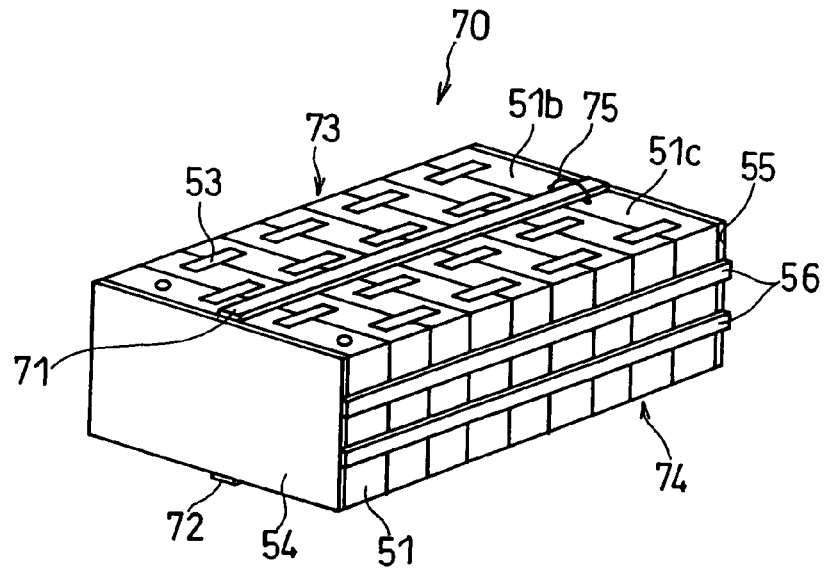
FIG. 7 is a perspective view of a battery module of still another embodiment of the present invention.

Further, in the stack 52, when the non-aqueous electrolyte batteries are placed in the width direction thereof, in addition to the thickness direction thereof, as shown in FIGS. 6 and 7, a connector may be provided for further connecting center parts of the two end plates. In FIGS. 6 and 7, the same reference numerals are used for the same components in FIG. 5.

In a battery module 60 in FIG. 6, other than bridges 56, two connectors 66 going through between a first row 62 and a second row 63 of the secondary batteries 51 stacked in the thickness direction thereof for connecting center parts of two end plates 64 and 65 are provided. These connectors 66 are placed in line with the height direction of the end plate.

In the battery module in FIG. 6, the connector 66 comprises a threaded shaft 66a and a nut 66b, and the threaded shaft is fixed on the end plate by the nut.

Each battery 51 is connected by a connective terminal 53.

When the batteries are stacked in the battery width direction as well in the stack, the width of the stack also increases. At this time, when the end plates placed in the ends of the stack in the battery thickness direction are connected by bridges placed in both ends of the stack width direction, the center parts of the end plates are bent towards the outside from the stack, which may cause an insufficient binding of the stack at the center parts of the end plates. As shown in FIG. 6, by further providing connectors for connecting the center parts of two end plates, the bent in the center part of the end plate can be reduced. Thus, the plurality of batteries included in the stack can be bound by two end plates sufficiently with even force.

Further, since the center parts of the two end plates can be connected for example by using only threaded shafts and nuts, the connection between the two end plates can be done easily for a low cost.

The connection between the center parts of the two end plates can also be done as shown in FIG. 7.

In a battery module 70 of FIG. 7, two end plates 54 and 55 are connected by a connector 71 for connecting the top edges of the end plates, and a connector 72 for connecting the lower edges of the end plates, other than the bridges 56. The top edges and the lower edge are parallel to the width direction of the end plate.

With the structure shown in FIG. 7, the plurality of batteries included in the stack can be sufficiently bound with even force by the two end plates, as in the battery module in FIG. 6. Further, since the space for the connector to go through between the first row 73 and the second row 74 does not have to be provided in the battery module in FIG. 7, space efficiency is high compared with the battery module in FIG. 6. Each battery 51 is connected by connective terminal 53, as in the above. However, the battery 51b included in the first row 73 and the battery 51c included in the second row 74 are connected by a wire 75 going through the top of the connector.

For the connectors 71 and 72 used in the battery module 70, the above bridge may be used.

In such case as well, the ratio of the end plate thickness Y to the battery thickness $\alpha$, Y/$\alpha$, is preferably 0.4 to 2.

In the above stack, the number of the non-aqueous electrolyte secondary battery to be stacked in the thickness direction thereof is preferably 2 to 30, and the number of the batteries to be stacked in the width direction thereof is 1 to 2.

In the following, the present invention is explained in detail based on Examples. Although a cylindrical battery comprising a wound-type electrode assembly was made in Examples, the present invention may be applied to for example a rectangular battery comprising the wound-type electrode assembly or a stack-type electrode assembly.

Example 1

Preparation of Positive Electrode

A positive electrode paste was prepared by mixing 30 kg of $LiCoO_2$, 10 kg of N-methyl-2-pyrrolidone (MNP) solution of polyvinylpyrrolidone (#1320 manufactured by Kureha Corporation, solid content 12 wt %), 900 g of acetylene black, and an appropriate amount of NMP with a double-armed kneader. The paste was applied on both sides of an aluminum foil with a thickness of 15 μm, dried, and pressed so that a total thickness of the foil with a formed active material layer was 120 μm, to obtain a positive electrode plate. The obtained positive electrode plate was cut so that the active material layer has a width of 54 mm and a length of 338 mm, to obtain a positive electrode. In the obtained positive electrode, an area of the active material layer per side of the positive electrode was 183 $cm^2$.

Preparation of Negative Electrode

A negative electrode paste was prepared by mixing 20 kg of artificial graphite, 750 g of acrylic acid modified styrene-butadiene copolymer (BM-400B manufactured by Zeon Corporation, solid content 40 wt %), 300 g of carboxymethyl cellulose, and an appropriate amount of water with a double-armed kneader. This paste was applied on both sides of a copper foil with a thickness of 10 μm, dried, and pressed so that a total thickness of the foil with a formed active material layer was 132 μm, to obtain a negative electrode plate. The obtained negative electrode plate was cut so that the active material layer has a width of 58 mm and a length of 408 mm, to obtain a negative electrode.

Preparation of Porous Heat-Resistant Layer

An aramid sheet with a thickness of 14 μm was obtained by carrying out a paper-making process for fibrous aramid resin with a 1000-mesh sieve. The sheet was heated for an hour with a temperature of 270° C., for a structural reinforcement and an adjustment of its porosity to 60%. Afterwards, the sheet was cut to give the same size as the negative electrode active material layer, to obtain a porous heat-resistant layer.

The porosity of the porous heat-resistant layer was obtained as noted in the above. The pore volume was obtained by multiplying the volume of the porous heat-resistant layer having the same area as the positive electrode active material layer, by the porosity of the porous heat-resistant layer.

Battery Assembly

Thus obtained positive electrode, negative electrode, and porous heat-resistant layer disposed between the positive electrode and the negative electrode were wound to give a substantially rectangular form, thereby obtaining an electrode assembly. At this time, an exposed portion of the aluminum foil where the positive electrode active material layer was not provided was arranged to be on top of the electrode assembly. An exposed portion of the copper foil where the negative electrode active material layer was not provided was arranged to be on bottom of the electrode assembly.

To the exposed portion of the aluminum foil, a positive electrode current collecting plate (thickness 0.3 mm) of aluminum was welded, and to the exposed portion of the copper foil, a negative electrode current collecting plate (thickness 0.3 mm) of copper was welded.

Then, the electrode assembly was housed in a substantially rectangular battery case with a thickness of 5 mm, a width of 42 mm, and a height of 71 mm. For the battery case material, a laminate film with a thickness of 70 μm was used. The laminate film is formed of a polyethylene layer (20 μm in thickness), an aluminum layer (30 μm in thickness), and a polyamide layer (30 μm in thickness). In the laminate film, the layers are laminated from the inner side to the outer side of the battery case, in the order of the polyethylene layer, the aluminum layer, and the polyamide layer.

Subsequently, into the battery case, 4 ml of a non-aqueous electrolyte including a solvent mixture of ethylene carbonate and ethyl methyl carbonate (volume ratio 1:3), and $LiPF_6$ dissolved in the solvent mixture was injected. The concentration of $LiPF_6$ was set to 1.0 mol/L.

Then, by sealing an opening of the battery case, a lithium ion secondary battery with a substantially rectangular shape was made. The obtained battery was regarded as the battery of Example 1. The theoretical capacity of the obtained battery was 860 mAh. The capacity of the obtained battery is regulated by the positive electrode. Thus, the theoretical capacity of the battery can be obtained by multiplying the capacity per unit weight of the positive electrode active material ($LiCoO_2$) (142 mAh/g), by the amount of the positive electrode active material included in the positive electrode active material layer.

Example 2

In this Example, a porous heat-resistant layer comprising a nonconductive filler (alumina) and a binder (polyvinylidene fluoride) was used.

A paste for forming a porous heat-resistant layer was prepared by mixing 3000 g of alumina powder with a median size of 2 μm and a tap density of 1.2 g/ml, 1000 g of an NMP solution of polyvinylidene fluoride (#1320 manufactured by Kureha Corporation, solid content 12 wt %), and an appropriate amount of NMP, with a double-armed kneader. The paste was applied on both negative electrode active material layers with a die coater. The thickness of the applied paste was set to 14 μm. Afterwards, the paste was dried by a hot blast of 130° C. at a speed of 2 m/min for four minutes. At this time, the porosity of the porous heat-resistant layer was set to be 60%. The negative electrode plate including the porous heat-resistant layer was cut to give the same size as in Example 1, to obtain a negative electrode. A battery of Example 2 was made in the same manner as Example 1, except that this negative electrode was used. The amount of the binder to be added was set to 4 parts by weight per 100 parts by weight of the nonconductive filler.

Examples 3 to 7

A separator was disposed between the porous heat-resistant layer and the positive electrode, and the separator thickness was set to 7 µm, 10 µm, 20 µm, 35 µm, and 40 µm. The ratio of the thickness of the porous heat-resistant layer to each separator thickness was 2, 1.4, 0.7, 0.4, and 0.35.

The thickness of the battery case was set to 5.2 mm, 5.3 mm, 5.6 mm, 6.0 mm, and 6.2 mm in accordance with the separator thickness.

Batteries of Examples 3 to 7 were made in the same manner as Example 2 except for the above. For the separator, a microporous film of polyethylene was used.

Examples 8 to 11

The median size of alumina included in the porous heat-resistant layer 3 was set to 0.3 µm, 0.5 µm, 3 µm, and 4 µm, so that the porosity of the porous heat-resistant layer was set to 35%, 40%, 66%, and 73%. Batteries of Examples 8 to 11 were made in the same manner as Example 5 except for the above.

Examples 12 to 13

The speed of the hot blast for drying the paste for forming the porous heat-resistant layer was set to 5 m/min and 7 m/min, so that the porosity of the porous heat-resistant layer was 80% and 85%. Batteries of Examples 12 to 13 were made in the same manner as Example 5 except for the above.

Example 14

The total thickness of the positive electrode was changed to 225 µm, and the length of the positive electrode active material layer was changed to 169 mm (the area of the positive electrode active material layer: 92 cm$^2$). The total thickness of the negative electrode was changed to 227 µm, and the length of the negative electrode active material layer was changed to 387 mm. The thickness of the battery case was changed to 5.4 mm. A battery of Example 14 was made in the same manner as Example 5, except for the above.

Example 15

The total thickness of the positive electrode was changed to 190 µm, and the length of the positive electrode active material layer was changed to 211 mm (the area of the positive electrode active material layer: 114 cm$^2$). The total thickness of the negative electrode was changed to 213 µm, and the length of the negative electrode active material layer was changed to 281 mm. The thickness of the battery case was changed to 4.9 mm. A battery of Example 15 was made in the same manner as Example 5 except for the above.

Example 16

The total thickness of the positive electrode was changed to 50 µm, and the length of the positive electrode active material layer was changed to 1020 mm (the area of the positive electrode active material layer: 549 cm$^2$). The total thickness of the negative electrode was changed to 51 µm, and the length of the negative electrode active material layer was changed to 1080 mm. The thickness of the battery case was changed to 7.1 mm. A battery of Example 16 was made in the same manner as Example 5 except for the above.

Example 17

The total thickness of the positive electrode was changed to 48 µm, and the length of the positive electrode active material layer was changed to 1060 mm (the area of the positive electrode active material layer: 572 cm$^2$). The total thickness of the negative electrode was changed to 49 µm, and the length of the negative electrode active material layer was changed to 1120 mm. The thickness of the battery case was changed to 7.2 mm. A battery of Example 17 was made in the same manner as Example 5 except for the above.

Examples 18 to 22

Batteries of Examples 18 to 22 were made in the same manner as Example 5, except that the amount of polyvinylidene fluoride included in the porous heat-resistant layer was set to 0.3 parts by weight, 0.5 parts by weight, 1.5 parts by weight, 7 parts by weight, and 8.5 parts by weight per 100 parts by weight of alumina.

Example 23

A battery of Example 23 was made in the same manner as Example 5, except that the binder included in the porous heat-resistant layer was changed from polyvinylidene fluoride to modified acrylic rubber (BM-720H manufactured by Zeon Corporation).

Examples 24 to 27

Batteries of Examples 24 to 27 were made in the same manner as Example 5, except that the nonconductive filler included in the porous heat-resistant layer was changed from alumina to silica, magnesia, titania, and zirconia. The median size of silica, magnesia, titania, and zirconia was set to 2 µm.

Example 28

A battery of Example 28 was made in the same manner as Example 5, except that the surface of the positive electrode was sandpapered to give a surface roughness Ra of 1.1 µm, which is rougher than the surface roughness (Ra=0.4 µm) of the porous heat-resistant layer. The surface roughness Ra of the positive electrode active material layer in the battery of Example 5 was 0.3 µm.

Comparative Example 1

A battery of Comparative Example 1 was made in the same manner as Example 5, except that the porous heat-resistant layer was not provided on the negative electrode.

Comparative Example 2

A battery of Comparative Example 2 was made in the same manner as Example 5, except that the median size of alumina included in the porous heat-resistant layer was changed to 0.25 μm to give the porous heat-resistant layer with the porosity of 28%.

Comparative Example 3

A battery of Comparative Example 3 was made in the same manner as Example 5, except that the speed of the hot blast for drying the paste for forming the porous heat-resistant layer was changed to 8 m/min to give the porous heat-resistant layer with the porosity of 89%.

Tables 1 to 3 show the following: the formation of the porous heat-resistant layer used for the batteries in Examples 1 to 28 and Comparative Examples 1 to 3; kind and the median size of the nonconductive filler; kind of the binder; the amount of the binder added per 100 parts by weight of nonconductive filler; the area of the positive electrode active material layer; the thickness B, porosity, and pore volume of the porous heat-resistant layer; pore volume/theoretical capacity; and the separator thickness A and the ratio B/A. As to the pore volume and the pore volume/theoretical capacity, the value per a side of the negative electrode, and the value per both sides of the negative electrode are shown. The thickness B of the porous heat-resistant layer is the thickness of the porous heat-resistant layer per a side of the negative electrode.

In batteries of Examples 1 to 28 and Comparative Examples 1 to 3, the theoretical capacity was set to the same.

TABLE 1

| | Porous heat-resistant layer formation | Kind of filler | median size of filler (μm) | Binder Kind | Binder Amount (parts by weight) |
|---|---|---|---|---|---|
| Ex. 1 | Aramid sheet | — | — | — | — |
| Ex. 2 | Filler + Binder | alumina | 2 | PVDF | 4 |
| Ex. 3 | Filler + Binder | alumina | 2 | PVDF | 4 |
| Ex. 4 | Filler + Binder | alumina | 2 | PVDF | 4 |
| Ex. 5 | Filler + Binder | alumina | 2 | PVDF | 4 |
| Ex. 6 | Filler + Binder | alumina | 2 | PVDF | 4 |
| Ex. 7 | Filler + Binder | alumina | 2 | PVDF | 4 |
| Ex. 8 | Filler + Binder | alumina | 0.3 | PVDF | 4 |
| Ex. 9 | Filler + Binder | alumina | 0.5 | PVDF | 4 |
| Ex. 10 | Filler + Binder | alumina | 3 | PVDF | 4 |
| Ex. 11 | Filler + Binder | alumina | 4 | PVDF | 4 |
| Ex. 12 | Filler + Binder | Alumina | 2 | PVDF | 4 |
| Ex. 13 | Filler + Binder | Alumina | 2 | PVDF | 4 |
| Ex. 14 | Filler + Binder | Alumina | 2 | PVDF | 4 |
| Ex. 15 | Filler + Binder | Alumina | 2 | PVDF | 4 |
| Ex. 16 | Filler + Binder | Alumina | 2 | PVDF | 4 |
| Ex. 17 | Filler + Binder | Alumina | 2 | PVDF | 4 |
| Ex. 18 | Filler + Binder | Alumina | 2 | PVDF | 0.3 |
| Ex. 19 | Filler + Binder | Alumina | 2 | PVDF | 0.5 |
| Ex. 20 | Filler + Binder | Alumina | 2 | PVDF | 1.5 |
| Ex. 21 | Filler + Binder | Alumina | 2 | PVDF | 7 |
| Ex. 22 | Filler + Binder | Alumina | 2 | PVDF | 8.5 |
| Ex. 23 | Filler + Binder | Alumina | 2 | Modified acrylic rubber | 4 |
| Ex. 24 | Filler + Binder | Silica | 2 | PVDF | 4 |
| Ex. 25 | Filler + Binder | Magnesia | 2 | PVDF | 4 |
| Ex. 26 | Filler + Binder | Titania | 2 | PVDF | 44 |
| Ex. 27 | Filler + Binder | Zirconia | 2 | PVDF | 4 |
| Ex. 28 | Filler + Binder | Alumina | 2 | PVDF | 4 |
| Comp. Ex. 1 | — | — | — | — | — |
| Comp. Ex. 2 | Filler + Binder | Alumina | 0.25 | PVDF | 4 |
| Comp. Ex. 3 | Filler + Binder | Alumina | 2 | PVDF | 4 |

TABLE 2

| | Area of positive electrode active material layer (cm²) | Porous heat-resistant layer Thickness B (μm) | Porous heat-resistant layer Porosity (%) | Porous heat-resistant layer pore volume V1* (ml) | Pore volume V1/ theoretical capacity (ml/Ah) | Separator thickness A (μm) | B/A |
|---|---|---|---|---|---|---|---|
| Ex. 1 | 183 | 14 | 60 | 0.1537 | 0.1787 | — | — |
| Ex. 2 | 183 | 14 | 60 | 0.1537 | 0.1787 | — | — |
| Ex. 3 | 183 | 14 | 60 | 0.1537 | 0.1787 | 7 | 2.00 |
| Ex. 4 | 183 | 14 | 60 | 0.1537 | 0.1787 | 10 | 1.40 |
| Ex. 5 | 183 | 14 | 60 | 0.1537 | 0.1787 | 20 | 0.70 |
| Ex. 6 | 183 | 14 | 60 | 0.1537 | 0.1787 | 35 | 0.40 |
| Ex. 7 | 183 | 14 | 60 | 0.1537 | 0.1787 | 40 | 0.35 |
| Ex. 8 | 183 | 14 | 35 | 0.0897 | 0.1043 | 20 | 0.70 |
| Ex. 9 | 183 | 14 | 40 | 0.1025 | 0.1192 | 20 | 0.70 |
| Ex. 10 | 183 | 14 | 66 | 0.1691 | 0.1966 | 20 | 0.70 |
| Ex. 11 | 183 | 14 | 73 | 0.1870 | 0.2175 | 20 | 0.70 |
| Ex. 12 | 183 | 14 | 80 | 0.2050 | 0.2383 | 20 | 0.70 |
| Ex. 13 | 183 | 14 | 85 | 0.2178 | 0.2532 | 20 | 0.70 |
| Ex. 14 | 92 | 14 | 60 | 0.0773 | 0.0899 | 20 | 0.70 |
| Ex. 15 | 114 | 14 | 60 | 0.0958 | 0.1113 | 20 | 0.70 |
| Ex. 16 | 549 | 14 | 60 | 0.4612 | 0.5362 | 20 | 0.70 |
| Ex. 17 | 572 | 14 | 60 | 0.4805 | 0.5587 | 20 | 0.70 |
| Ex. 18 | 183 | 14 | 60 | 0.1537 | 0.1787 | 20 | 0.70 |
| Ex. 19 | 183 | 14 | 60 | 0.1537 | 0.1787 | 20 | 0.70 |
| Ex. 20 | 183 | 14 | 60 | 0.1537 | 0.1787 | 20 | 0.70 |
| Ex. 21 | 183 | 14 | 60 | 0.1537 | 0.1787 | 20 | 0.70 |
| Ex. 22 | 183 | 14 | 60 | 0.1537 | 0.1787 | 20 | 0.70 |
| Ex. 23 | 183 | 14 | 60 | 0.1537 | 0.1787 | 20 | 0.70 |
| Ex. 24 | 183 | 14 | 60 | 0.1537 | 0.1787 | 20 | 0.70 |
| Ex. 25 | 183 | 14 | 60 | 0.1537 | 0.1787 | 20 | 0.70 |
| Ex. 26 | 183 | 14 | 60 | 0.1537 | 0.1787 | 20 | 0.70 |
| Ex. 27 | 183 | 14 | 60 | 0.1537 | 0.1787 | 20 | 0.70 |
| Ex. 28 | 183 | 14 | 60 | 0.1537 | 0.1787 | 20 | 0.70 |
| Comp. Ex. 1 | 183 | — | — | — | — | 20 | — |
| Comp. Ex. 2 | 183 | 14 | 28 | 0.0717 | 0.0834 | 20 | 0.70 |
| Comp. Ex. 3 | 183 | 14 | 89 | 0.2280 | 0.2651 | 20 | 0.70 |

*per a side of the negative electrode

Evaluation

The batteries are evaluated as follows.

Drop Resistance Test

In the batteries of Examples 1 to 28 and Comparative Examples 1 to 3, 20 batteries for each Example, were dropped from a height of 2 m to a concrete floor. The drop was carried out consecutively for 15 times. The drop was carried out so that the battery cover side crashes on the floor.

Afterwards, an X-ray transmission method was used to determine the presence or absence of a misalignment of the positive electrode and the negative electrode in the electrode assembly and a breakage of porous heat-resistant layer. As to the misalignment of the positive electrode and the negative electrode, the number of the battery in which the positive electrode went out of position from the negative electrode was determined. As to the breakage of the porous heat-resistant layer, the number of the battery which showed even a partial breakage of the porous heat-resistant layer observable was determined. The results are shown in Table 3.

Life Test

The following life test was carried out for each battery, under the condition that both ends (in the thickness direction) of the battery was sandwiched by a stainless steel plate with a thickness of 20 mm, and a load of 17 kgf/cm² was applied on each end.

Preliminary charge and discharge was carried out, first. To be specific, a cycle of charge and discharge, at a current of 430 mA and with a changing battery voltage in a range of 3.0 to 4.1 V, was carried out twice.

Afterwards, the battery was charged at a current of 430 mA until the battery voltage reached 4.1 V. The battery after the charge was aged for 7 days at 45° C.

A first charge and discharge cycle was repeated 500 times for the aged battery. In the first charge and discharge cycle, a load of 17 kgf/cm² was applied as in the above, the battery voltage was changed in the range of 3.0 to 4.2 V at the current of 860 mA. The ratio of the discharge capacity at $500^{th}$ cycle to the discharge capacity at the first cycle after the aging (initial discharge capacity) was obtained by percentage, and regarded as a capacity retention rate. The capacity retention rate was used as a criterion for cycle life characteristic. The results are shown in Table 3.

TABLE 3

| | Pore volume V2** of porous heat-resistant layer (ml) | Pore volume V2/ theoretical capacity (ml/Ah) | capacity retention rate (%) | Number of battery in which active material layer breakage occurred | Number of battery in which misalignment occurred |
|---|---|---|---|---|---|
| Ex. 1 | 0.3074 | 0.3574 | 80 | 6 | 1 |
| Ex. 2 | 0.3074 | 0.3574 | 81 | 4 | 1 |
| Ex. 3 | 0.3074 | 0.3574 | 85 | 5 | 2 |
| Ex. 4 | 0.3074 | 0.3574 | 85 | 2 | 1 |
| Ex. 5 | 0.3074 | 0.3574 | 86 | 0 | 1 |
| Ex. 6 | 0.3074 | 0.3574 | 74 | 0 | 1 |
| Ex. 7 | 0.3074 | 0.3574 | 60 | 0 | 2 |
| Ex. 8 | 0.1793 | 0.2086 | 64 | 0 | 1 |
| Ex. 9 | 0.2050 | 0.2384 | 71 | 0 | 1 |
| Ex. 10 | 0.3382 | 0.3932 | 82 | 1 | 2 |
| Ex. 11 | 0.3740 | 0.4350 | 83 | 4 | 1 |
| Ex. 12 | 0.4100 | 0.4766 | 82 | 2 | 1 |
| Ex. 13 | 0.4356 | 0.5064 | 82 | 4 | 2 |
| Ex. 14 | 0.1546 | 0.1798 | 66 | 0 | 1 |
| Ex. 15 | 0.1916 | 0.2226 | 72 | 0 | 1 |
| Ex. 16 | 0.9224 | 1.0724 | 72 | 0 | 2 |
| Ex. 17 | 0.9610 | 1.1174 | 65 | 0 | 2 |
| Ex. 18 | 0.3074 | 0.3574 | 83 | 5 | 1 |
| Ex. 19 | 0.3074 | 0.3574 | 82 | 2 | 1 |
| Ex. 20 | 0.3074 | 0.3574 | 83 | 1 | 2 |
| Ex. 21 | 0.3074 | 0.3574 | 73 | 0 | 1 |
| Ex. 22 | 0.3074 | 0.3574 | 68 | 0 | 1 |
| Ex. 23 | 0.3074 | 0.3574 | 80 | 0 | 2 |
| Ex. 24 | 0.3074 | 0.3574 | 82 | 0 | 1 |
| Ex. 25 | 0.3074 | 0.3574 | 80 | 0 | 2 |
| Ex. 26 | 0.3074 | 0.3574 | 81 | 0 | 1 |
| Ex. 27 | 0.3074 | 0.3574 | 83 | 0 | 2 |
| Ex. 28 | 0.3074 | 0.3574 | 84 | 0 | 0 |
| Comp. Ex. 1 | — | — | 54 | 0 | 4 |
| Comp. Ex. 2 | 0.1434 | 0.1668 | 51 | 0 | 1 |
| Comp. Ex. 3 | 0.4560 | 0.5302 | 86 | 9 | 2 |

**per both sides of the negative electrode

In the battery of Comparative Example 1, in which the porous heat-resistant layer was not used and only the separator of polyethylene was disposed between the positive electrode 1 and the negative electrode 2, the capacity retention rate dropped remarkably. This is probably because when the battery is repeatedly charged and discharged under a load and under a condition that the charge of the battery case size is restrained, the electrode assembly is excessively loaded to force out the non-aqueous electrolyte from the separator.

In the battery of Comparative Example 2 as well, in which the porosity (pore volume) of the porous heat-resistant layer was excessively small, the capacity retention rate at the time of restraining the electrode assembly deformation was low, being the same level as that of the battery of Comparative Example 1. This is probably because when the pore volume of the porous heat-resistant layer is excessively small, the porous heat-resistant layer cannot keep the sufficient amount of the non-aqueous electrolyte for the battery to function, relative to the force generated from the restraining of the electrode assembly deformation.

In the battery of Comparative Example 3, in which the pore volume of the porous heat-resistant layer is excessively large, the number of the battery with the occurrence of the porous heat-resistant layer breakage was large at the drop test. When the pore volume of the porous heat-resistant layer was excessively large, the structural strength of the porous heat-resistant layer drastically drops, to probably cause the porous heat-resistant layer to become unable to keep the shape while the battery is in use.

On the other hand, in the battery of each of the Examples in which the porous heat-resistant layer 3 with an appropriate pore volume was disposed between the positive electrode and the negative electrode, cycle life characteristic and drop-resistance were improved remarkably.

Comparison of each Example is made below.

In the battery of Example 1, in which an aramid sheet was used as the porous heat-resistant layer, the porous heat-resistant layer tended to break at the time of the drop, though not as much as the battery of Comparative Example 3. This is probably because of a slightly weak structural strength of the aramid sheet, and because the aramid sheet was not attached to the active material layer of any of the electrodes.

In the battery of Example 2, in which the porous heat-resistant layer was formed of a nonconductive filler and a binder, the number of the battery in which the porous heat-resistant layer breakage occurred was decreased at the time of the drop-test. This is probably because not only the binder causes strong binding effects between the particles of the nonconductive filler, but also the binder can attach the porous heat-resistant layer to the active material layer.

In the batteries of Examples 3 to 7, in which the porous heat-resistant layer and a separator comprising polyethylene were used, the number of the battery in which the porous heat-resistant layer breakage occurred was decreased at the time of the drop-test, compared with the battery of Example 2. This is probably because the highly stiff but fragile porous heat-resistant layer was protected by the separator.

The effect of the protection of the porous heat-resistant layer by the separator was notable when the ratio of the thickness B of porous heat-resistant layer to the thickness A of the separator, B/A was 2 or below, especially when 1.4 or below. Even when the separator had a large thickness, and the ratio B/A was 0.35, the capacity retention rate showed an excellent value, and the number of the battery in which the porous heat-resistant layer breakage and the misalignment occurred was small. When the ratio B/A was below 0.4, cycle life characteristic was reduced slightly, compared with the batteries of Examples 3 to 6. This is probably because when the size change in the battery was restrained, the separator could not fully exhibit the ability to keep the non-aqueous electrolyte, and affected as a mere resistant component in battery reaction.

The above results show that the ratio B/A is preferably 0.35 to 2, and further preferably 0.4 to 1.4.

Among the batteries of Examples 8 to 11, in which the median size of alumina included in the porous heat-resistant layer was changed and the porosity of the porous heat-resistant layer was changed, it was found that in the battery of Example 8 including the nonconductive filler with the median size of 0.3 μm, cycle life characteristic was decreased slightly. This is probably because the excessively small median size of the nonconductive filler caused the nonconductive filler to be charged too densely, and decreased the porosity of the porous heat-resistant layer 3 to 35%. On the other hand, in the battery of Example 11, in which the nonconductive filler had the median size of 4 µm, the number of the battery with the porous heat-resistant layer breakage was slightly large at the time of the drop-test. This is probably because the excessively large nonconductive filler caused the charging state of the nonconductive filler rough, more than it can be assumed from the actual porosity, causing the structural strength of the porous heat-resistant layer to be reduced.

The above results show that the median size of the nonconductive filler is preferably 0.5 to 3 µm.

From the results of the batteries of Examples 12 to 13, in which the drying conditions for the paste for forming the porous heat-resistant layer were changed to adjust the porosity of the porous heat-resistant layer, it was found that in the battery of Example 12, in which the porosity of the porous heat-resistant layer was 85%, the number of the battery with the porous heat-resistant layer breakage was slightly increased at the time of the drop-test. The above results and the results from the Examples 8 to 11 show that the porosity of the porous heat-resistant layer is preferably 40 to 80%.

From the results of Examples 14 to 17, in which the area of the negative electrode active material layer (the area of the porous heat-resistant layer) was changed to adjust the ratio of the pore volume V of the porous heat-resistant layer to the theoretical capacity C of the battery, it was found that when the ratio of the pore volume V1 of the porous heat-resistant layer to the theoretical capacity C (per a side of the negative electrode) is below 0.0899 ml/Ah, i.e., the ratio of the pore volume V2 of the porous heat-resistant layer to the theoretical capacity C (per both sides of the negative electrode) was below 0.18 ml/Ah, cycle life characteristic was reduced slightly. This is probably because the amount of the porous heat-resistant layer capable of keeping the non-aqueous electrolyte was reduced. On the other hand, when the ratio of the pore volume V1 of the porous heat-resistant layer to the theoretical capacity C (per a side of the negative electrode) is over 0.57 ml/Ah, i.e., when the ratio of the pore volume V2 of the porous heat-resistant layer to the theoretical capacity C (per both sides of the negative electrode) is over 1.117 ml/Ah, cycle life characteristic was slightly reduced. When the pore volume of the porous heat-resistant layer was too large, the pores without the non-aqueous electrolyte filled hold a majority in the porous heat-resistant layer. Thus, reaction resistance of the porous heat-resistant layer to the battery reaction increased, probably causing a slight decrease in cycle life characteristic.

The above results show that the ratio V2/C is preferably 0.18 to 1.117 ml/Ah.

From the results of the batteries of Examples 18 to 22, in which the amount of PVDF included in the porous heat-resistant layer was changed, it was found that when the amount of PVDF was 0.5 part by weight per 100 parts by weight of nonconductive filler, because the amount of the binder was too small, the number of the battery with the porous heat-resistant layer breakage increased slightly at the time of the drop-test.

On the other hand, when the amount of PVDF was over 7 parts by weight per 100 parts by weight of the nonconductive filler, cycle life characteristic was reduced slightly. This is probably because the binder included in the porous heat-resistant layer swelled by absorbing the non-aqueous electrolyte after the battery formation, and as a result, the pore volume in the porous heat-resistant layer became small and ion conductivity was decreased.

The above results show that the amount of the binder included in the porous heat-resistant layer is preferably 0.5 to 7 parts by weight per 100 parts by weight of the nonconductive filler.

The results of Example 23 show that excellent cycle life characteristic and drop-resistance can be obtained even when the kind of the binder was changed from PVDF to modified acrylic rubber. This modified acrylic rubber also exhibits high binding effects similar to that of PVDF with a small amount, when used as a binder.

On the other hand, when the porous heat-resistant layer includes the mixture of particulate modified acrylic rubber (BM-500B manufactured by Zeon Corporation) and PVDF (weight ratio 1:1) as a binder, and the amount of the binder is 4 parts by weight per 100 parts by weight of alumina, the porous heat-resistant layer showed sufficient adhesion to the negative electrode active material layer. However, when the porous heat-resistant layer includes the mixture of polytetrafluoroethylene and CMC (weight ratio 1:1) as a binder, and the amount of the binder is 4 parts by weight per 100 parts by weight of alumina, sufficient adhesion could not be obtained between the porous heat-resistant layer and the negative electrode active material layer.

Thus, the binder used for the porous heat-resistant layer 3 preferably includes at least one of PVDF and modified acrylic rubber.

From the results of the batteries of Examples 24 to 27, in which the kind of the nonconductive filler was changed, it was found that the equivalent results with the case when alumina was used as the nonconductive filler could be obtained even when silica, magnesia, titania, or zirconia was used.

In the battery of Example 28, in which the surface roughness of the positive electrode active material layer was made large, the misalignment of the positive electrode and the negative electrode at the time of the drop-test could be improved remarkably. Since the porous heat-resistant layer is highly stiff but fragile, the relative position of the positive electrode and the negative electrode tends to become slightly misaligned due to drops or the like. However, due to the anchor effects by increasing the surface roughness of the positive electrode active material layer, the porous heat-resistant layer can be caught into the positive electrode active material layer. Thus, the misalignment of the relative position of the positive electrode and the negative electrode due to the drop probably was improved remarkably.

In Examples below, battery modules as shown in FIG. 4 were made.

Examples 29 to 33

A battery module as shown in FIG. 4 was made as in the following by using 20 lithium ion secondary batteries in Example 5.

Each battery was connected in series by a connective terminal to obtain a stack. Then, at both ends of the stack in the battery thickness direction, end plates of aluminum with a thickness of 1.7 mm were placed. The two end plates were connected by four bridges, to bind the 20 batteries. At this time, to each battery included in the battery module, a load of 17 kgf/cm$^2$ was applied to the ends of the battery in the thickness direction thereof.

A battery module of Example 29 was thus made. Since the battery of Example 5 had a thickness α of 5.6 mm, and the thickness Y of the end plate was 1.7 mm, the ratio Y/α was 0.3.

Battery modules of Examples 30 to 33 were made in the same manner as Example 29, except that the thickness of the end plate was set to 2.2 mm, 6.7 mm, 11.2 mm, and 14.0 mm. In the battery modules of Examples 30 to 33, the ratio Y/α was 0.4, 1.2, 2.0, and 2.5.

Evaluation

The above first charge and discharge cycle was carried out 500 times for the battery module of each Example. The ratio of the discharge capacity at the 500th cycle to the discharge capacity at the first cycle is shown by percentage, to regard it as the capacity retention rate. This capacity retention rate was used as a criterion for cycle life characteristic. The size change in the battery module was checked as well. The results are shown in Table 4.

TABLE 4

|  | Ratio Y/α | Capacity retention rate (%) | Size change in module |
|---|---|---|---|
| Ex. 29 | 0.3 | 83 | Changed |
| Ex. 30 | 0.4 | 82 | Slightly changed |
| Ex. 31 | 1.2 | 79 | No change |
| Ex. 32 | 2.0 | 75 | No change |
| Ex. 33 | 2.5 | 69 | No change |

The results of Table 4 show that by using the battery of the present invention, the reduction in cycle life characteristic of the battery module can be eased.

However, in the battery module of Example 29, with the ratio Y/α of below 0.4, the size change could be observed visually. In the battery module of Example 33, with the ratio Y/α of over 2.0, cycle life characteristic was slightly reduced. Such reduction is probably because when the end plates are excessively thick, the distortion from the electrode assembly deformation could not be eased between the stacked batteries. Thus, the above results show that the ratio Y/α is preferably 0.4 to 2.

In Examples below, battery modules as shown in FIG. 6 were made.

Examples 34 to 38

A battery module comprising a stack including a first row and a second row was made. In the stack, 40 lithium ion secondary batteries of Example 5 were used to arrange each set of 20 batteries to be stacked in the thickness direction thereof.

A stack comprising the first row and the second row was obtained, by arranging each battery in the thickness direction thereof to form a row with 20 batteries. In the obtained stack, a gap with a predetermined width was provided between the first row and the second row.

Then, on both ends of the stack in the battery thickness direction, end plates of aluminum with a thickness of 1.7 mm were placed. At the center portion of each end plate, two holes were provided in series in the height direction of the plate.

A threaded shaft was inserted into each hole provided at the center portion of the end plate, allowed to go through between the first row and the second row, and fixed with a nut. The center portions in the two end plates were thus connected by two connectors. Further, by using two bridges provided at both ends of the stack in the width direction thereof, two end plates were further connected. At this time, in each battery included in the battery module, a load of 17 kgf/cm$^2$ was applied to the ends of the battery in the thickness direction thereof.

As in the above, the plurality of batteries included in the stack were bound by the end plates, bridges and connectors, to produce a battery module of Example 34. In this battery module as well, the ratio of the thickness Y of the end plate to the thickness a of the battery (Y/α) was 0.3.

Battery modules of Examples 35 to 38 were made in the same manner as Example 34, except that the thickness of the end plate was set to 2.2 mm, 6.7 mm, 11.2 mm, and 14.0 mm. In the battery modules of Examples 30 to 33, the ratio Y/α was 0.4, 1.2, 2.0, and 2.5.

Evaluation

The above first charge and discharge cycle was carried out 500 times for the battery module in each Example. The ratio of the discharge capacity at the 500th cycle to the discharge capacity at the first cycle is shown by percentage, to regard it as the capacity retention rate. This capacity retention rate was used as a criterion for cycle life characteristic. The size change in the battery module was checked as well. The results are shown in Table 5.

TABLE 5

|  | Ratio Y/α | Capacity retention rate (%) | Size change in module |
|---|---|---|---|
| Ex. 34 | 0.3 | 84 | Changed |
| Ex. 35 | 0.4 | 81 | Slightly changed |
| Ex. 36 | 1.2 | 80 | Slightly changed |
| Ex. 37 | 2.0 | 76 | No change |
| Ex. 38 | 2.5 | 74 | No change |

The results of Table 5 show that by using the battery of the present invention, reduction in cycle life characteristic can be reduced even in the case where the battery module has a stack in which two batteries are arranged in the battery width direction.

Table 5 also shows that the ratio of the thickness Y of the end plate to the thickness α of the battery, Y/α, is preferably 0.4 to 2.

According to the present invention, even under the environment where the size change in the battery is unacceptable, high capacity non-aqueous electrolyte secondary batteries with excellent cycle life characteristic, and battery modules comprising a plurality of such batteries can be provided. Such batteries and battery modules can be used as a power source for devices requiring a high output, such as HEVs and electrically-powered tools.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A non-aqueous electrolyte secondary battery comprising an electrode assembly, a non-aqueous electrolyte, and a substantially rectangular battery case for housing said electrode assembly and said non-aqueous electrolyte, said battery case having a thickness α, a width β, and a height γ satisfying a relation α<β≦γ:

wherein said electrode assembly includes a positive electrode, a negative electrode, and a porous heat-resistant layer disposed between said positive electrode and said negative electrode;

said positive electrode includes a positive electrode active material layer and said negative electrode includes a negative electrode active material layer;

a ratio of a pore volume in a predetermined area of said porous heat-resistant layer to a theoretical capacity of said battery is 0.18 to 1.117 ml/Ah, said predetermined area having a same area as said positive electrode active material layer; and a porosity of said porous heat-resistant layer is 35 to 85%, said porous heat-resistant layer includes a nonconductive filler and a binder, said nonconductive filler has a median size of 0.3 to 4 μm, and an amount of said binder is 0.3 to 8.5 parts by weight per 100 parts by weight of said nonconductive filler.

2. The non-aqueous electrolyte secondary battery in accordance with claim 1, further including a separator comprising a resin and being disposed between said positive electrode and said negative electrode.

3. The non-aqueous electrolyte secondary battery in accordance with claim 2, wherein a ratio of a thickness B of said porous heat-resistant layer to a thickness A of said separator, B/A, is 0.35 to 2.

4. The non-aqueous electrolyte secondary battery in accordance with claim 1, wherein said porous heat-resistant layer is attached to at least one of said positive electrode active material layer and said negative electrode active material layer.

5. The non-aqueous electrolyte secondary battery in accordance with claim 1, wherein said nonconductive filler includes at least one selected from the group consisting of alumina, silica, magnesia, titania, and zirconia.

6. The non-aqueous electrolyte secondary battery in accordance with claim 1, wherein said binder includes at least one of polyvinylidene fluoride and acrylic rubber.

7. The non-aqueous electrolyte secondary battery in accordance with claim 1, wherein said porous heat-resistant layer is attached to one of said positive electrode active material layer or said negative electrode active material layer, and the other of said positive electrode active material layer or said negative electrode active material layer to which said porous heat-resistant layer is not attached has a larger degree of surface roughness than that of said porous heat-resistant layer.

8. A battery module comprising:
    (a) a stack in which at least two non-aqueous electrolyte secondary batteries of claim 1 are stacked in at least a thickness direction thereof;
    (b) end plates placed at both ends of said stack, said both ends being the ends in the thickness direction of said battery; and
    (c) at least two bridges for binding said at least two non-aqueous electrolyte secondary batteries by connecting one of said end plates with the other of said end plates.

9. The battery module in accordance with claim 8, wherein a ratio of a thickness Y of said end plate to a thickness α of the battery case of said battery, Y/α, is 0.4 to 2.

10. The battery module in accordance with claim 8, wherein said stack, end plates and bridges are configured such that a load of 17 to 100 kgf/cm$^2$ is applied to the ends of each of said batteries in the thickness direction thereof.

11. The non-aqueous electrolyte secondary battery in accordance with claim 1, wherein said nonconductive filler includes alumina.

* * * * *